US 9,821,888 B1

(12) United States Patent
Gulino et al.

(10) Patent No.: US 9,821,888 B1
(45) Date of Patent: Nov. 21, 2017

(54) FISHING POLE HOLDER MOUNTED TABLE FOR A BOAT

(71) Applicants: Tony Gulino, Waretown, NJ (US); Joshua Gulino, Waretown, NJ (US)

(72) Inventors: Tony Gulino, Waretown, NJ (US); Joshua Gulino, Waretown, NJ (US)

( * ) Notice: Subject to any disclaimer, the term of this patent is extended or adjusted under 35 U.S.C. 154(b) by 0 days.

(21) Appl. No.: 15/211,266

(22) Filed: Jul. 15, 2016

(51) Int. Cl.
*A47B 69/00* (2006.01)
*B63B 29/04* (2006.01)
*A01K 97/10* (2006.01)

(52) U.S. Cl.
CPC .............. *B63B 29/04* (2013.01); *A01K 97/10* (2013.01); *B63B 2029/046* (2013.01); *B63B 2709/00* (2013.01)

(58) Field of Classification Search
CPC ................................ A47B 69/00; B63B 29/04
USPC .... 269/16; 108/42, 47, 46.5, 157.13, 25, 27, 108/28, 97, 98, 152, 24; 224/406, 519, 224/545–547, 682; 114/345, 364
See application file for complete search history.

(56) References Cited

U.S. PATENT DOCUMENTS

| 493,605 | A |   | 3/1893  | Tiffany |         |
|---------|---|---|---------|---------|---------|
| 1,464,889 | A | * | 8/1923 | Stirn ...................... | A47B 31/02 |
|         |   |   |         |         | 108/50.13 |
| 1,642,385 | A | * | 9/1927 | Pryor ..................... | A47B 19/04 |
|         |   |   |         |         | 160/351 |
| 1,727,032 | A | * | 9/1929 | Guignon, Jr. ........ | A47B 96/027 |
|         |   |   |         |         | 108/23 |
| 2,267,861 | A | * | 12/1941 | Haley ...................... | A47C 7/70 |
|         |   |   |         |         | 108/135 |
| 2,533,893 | A | * | 12/1950 | Nussbaum ............. | A45D 44/04 |
|         |   |   |         |         | 108/137 |
| 2,604,930 | A |   | 7/1952  | Dean et al. |         |
| 3,665,867 | A | * | 5/1972 | Carlson .................. | A47B 37/00 |
|         |   |   |         |         | 108/25 |
| 3,769,647 | A | * | 11/1973 | Basa ....................... | B63B 35/73 |
|         |   |   |         |         | 441/38 |
| 4,062,299 | A |   | 12/1977 | Smith |         |
| 4,086,859 | A |   | 5/1978  | Dondero |         |
| 4,177,737 | A | * | 12/1979 | Brickman ................ | A47C 9/10 |
|         |   |   |         |         | 108/11 |

(Continued)

FOREIGN PATENT DOCUMENTS

| DE | 29914016 | * | 11/1999 |
| DE | 102008015896 | * | 10/2009 |

(Continued)

*Primary Examiner* — Janet M Wilkens
(74) *Attorney, Agent, or Firm* — Stevenson IP, LLC

(57) ABSTRACT

A fishing pole holder mounted table for a boat including a tray body and a swivel jointed cylindrical post having a lock knob to mount the tray body within a fishing pole holder within a gunnel of the boat in a level condition. A raised perimeter wall prevents items from sliding away from the tray body. Openings disposed in the tray body top surface receive sealable containers therein to store items, such as food, therein. A removable shade is provided to cover the tray body. Flexible removable rods have hooks to secure the shade to the tray body proximal the forward end. Engageable hook and loop fastener strips on a rear side of the perimeter wall and on a rearward end of the shade also attach the shade to the tray body. A light emitting diode light bar is centrally disposed on the perimeter wall to illuminate the tray bar.

4 Claims, 5 Drawing Sheets

(56) References Cited

U.S. PATENT DOCUMENTS

| | | | | |
|---|---|---|---|---|
| 4,449,763 A * | 5/1984 | Barnett | G06F 3/0202 | 160/352 |
| 4,896,611 A * | 1/1990 | Lorenzini | B60N 3/002 | 108/25 |
| 5,323,757 A * | 6/1994 | Humphrey | F24C 1/16 | 126/24 |
| H001382 H * | 12/1994 | Goldberg | A47C 7/62 | 108/25 |
| 5,413,035 A * | 5/1995 | Fernandez | B60N 3/005 | 100/44 |
| 6,381,769 B1 * | 5/2002 | Lofquist, Jr. | A47K 3/006 | 4/555 |
| 6,807,902 B1 * | 10/2004 | Ginter | B60N 3/002 | 100/44 |
| 7,013,831 B1 | 3/2006 | Garelick | | |
| 7,589,979 B2 * | 9/2009 | Chang et al. | H05K 9/0069 | 361/818 |
| 2006/0277813 A1 * | 12/2006 | Saldana | A47G 23/0241 | 43/21.2 |
| 2010/0078904 A1 * | 4/2010 | Collins | B08B 3/006 | 280/47.11 |
| 2011/0209645 A1 * | 9/2011 | Albornoz Pinzon | A47B 13/16 | 108/25 |
| 2012/0048149 A1 * | 3/2012 | Pendleton | A47G 23/0641 | 108/13 |
| 2015/0208634 A1 * | 7/2015 | Box et al. | A01K 97/10 | 108/25 |
| 2015/0245706 A1 * | 9/2015 | Fill | A47J 47/005 | 269/16 |

FOREIGN PATENT DOCUMENTS

| | | | |
|---|---|---|---|
| FR | 2409709 | * | 6/1979 |
| WO | 2016/053160 | * | 4/2016 |

* cited by examiner

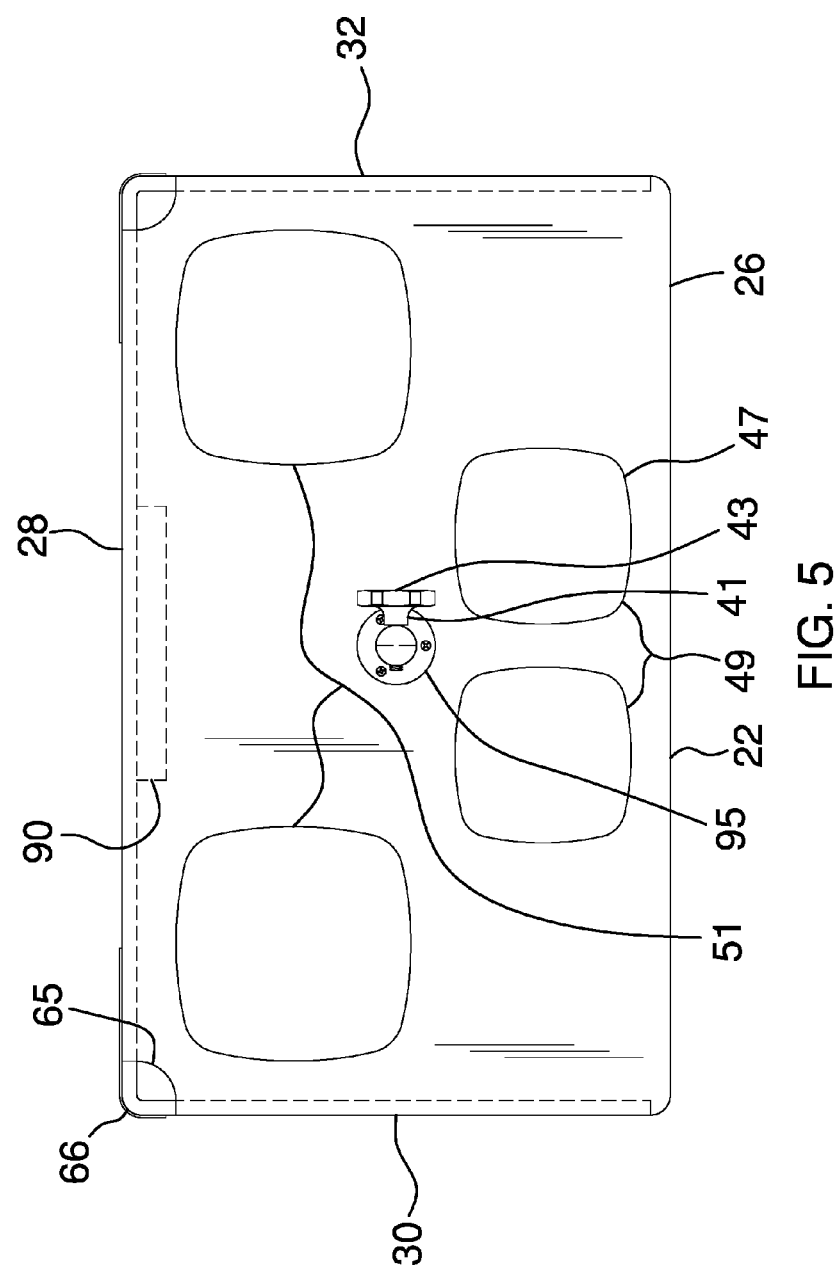

FISHING POLE HOLDER MOUNTED TABLE FOR A BOAT

BACKGROUND OF THE INVENTION

Various types of boat accessories to enhance usable deck space and to anchor down objects contained within a boat are known in the prior art. However, what is needed and what the present device provides is a fishing pole holder mounted table for a boat including a tray body and a swivel jointed cylindrical post having a lock knob to mount the tray body within a fishing pole holder within a gunnel of the boat in a level condition in order to conserve limited space on the boat and to prevent spillage of food items on the boat. A raised perimeter wall prevents items from sliding away from the tray body. Openings disposed in the tray body top surface receive sealable containers therein to store items, such as food, therein. A removable shade is provided to cover the tray body. Flexible removable rods have hooks to secure the shade to the tray body proximal the forward end. Engageable hook and loop fastener strips on a rear side of the perimeter wall and on a rearward end of the shade also attach the shade to the tray body. A light emitting diode light bar is centrally disposed on the perimeter wall to illuminate the tray bar.

FIELD OF THE INVENTION

The present invention relates to boat accessories, and more particularly, to a fishing pole holder mounted table for a boat.

SUMMARY OF THE INVENTION

The general purpose of the present fishing pole holder mounted table for a boat, described subsequently in greater detail, is to provide a fishing pole holder mounted table for a boat which has many novel features that result in a fishing pole holder mounted table for a boat which is not anticipated, rendered obvious, suggested, or even implied by prior art, either alone or in combination thereof. To accomplish this, the present fishing pole holder mounted table for a boat includes a tray body and a cylindrical post to mount the tray body within a fishing pole holder within a gunnel of the boat. The post includes a swivel joint disposed proximal a top end thereof and a lock knob to lock the swivel joint into a selected position to place the tray body in a level condition. A raised perimeter wall is continuously disposed along tray body except for the front side to prevent items from sliding away from the tray body. A plurality of openings is disposed in the tray body from the top surface through the bottom surface. A plurality of sealable containers is provided for storing items, such as food, and is insertable within a respective one of the openings. A hole is disposed at a corner between the rear side and each of the right side and the left side. The tray body is preferably formed of plastic or another waterproof material.

A shade, preferably formed of marine grade material, is provided to also protect items disposed within the containers and atop the tray body from negative environmental elements, such as heat and rain. The shade has an inverted substantially U-shaped right wall, a left wall which is a mirror image of the right wall, and a convex central portion between the right wall and the left wall. Each of the right wall, the left wall, and the central portion has a forward end and a rearward end. A pair of flexible removable rods is provided to secure the shade to the tray body. The rods are removable to accommodate storage. Each rod has an upper end attached to the forward end of a respective one of the right wall and the left wall, a lower end, and a hook attached to the lower end. An aperture is disposed approximately centrally within the perimeter wall proximal each of the left side and the right side. Each hook is engageable to a respective one of the apertures.

A hook and loop fastener first strip is disposed on the rearward end of each of the right wall, the left wall, and a portion of the central portion directly adjacent to each of the right wall and the left wall. A hook and loop fastener second strip is disposed on the perimeter wall of the tray body along a portion of the rear side proximal each of the left and right sides and on each of the right side and the left side proximal the rear side. Each hook and loop fastener second strip is engageable to the respective hook and loop fastener first strip to further assist in attaching the shade to the tray body. A battery-operated light emitting diode light bar is centrally disposed on the raised perimeter wall between the hook and loop fastener second strips. The light bar is one of water resistant and waterproof. The light bar is provided to illuminate the tray bar for assembly and also for viewing items on the tray bar or with the containers in low light or dark conditions.

Thus has been broadly outlined the more important features of the present fishing pole holder mounted table for a boat so that the detailed description thereof that follows may be better understood and in order that the present contribution to the art may be better appreciated.

BRIEF DESCRIPTION OF THE DRAWINGS

Figures

FIG. 5 is a bottom plan view without the shade.

DETAILED DESCRIPTION OF THE DRAWINGS

Figure 1:
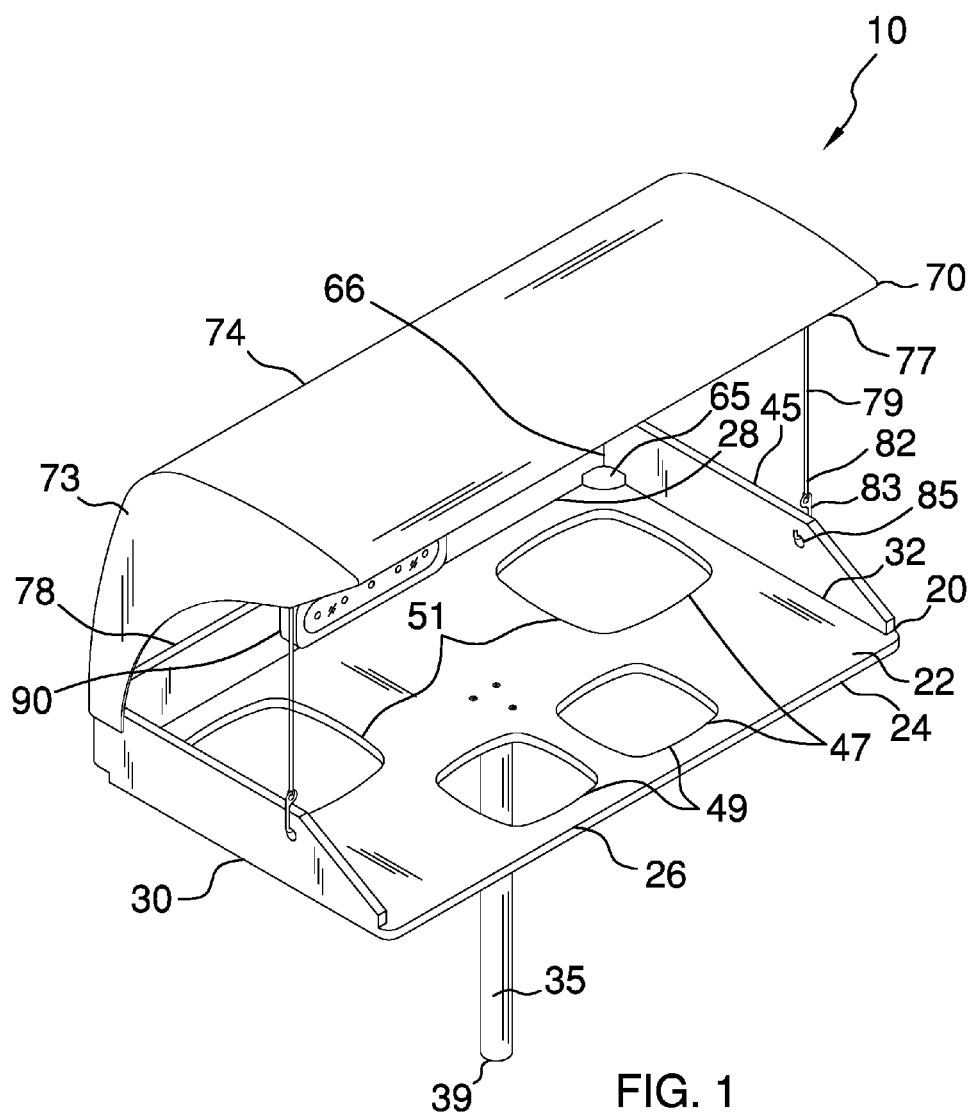
FIG. 1 is an isometric view of a tray body with a shade attached thereto.
Figure 2:
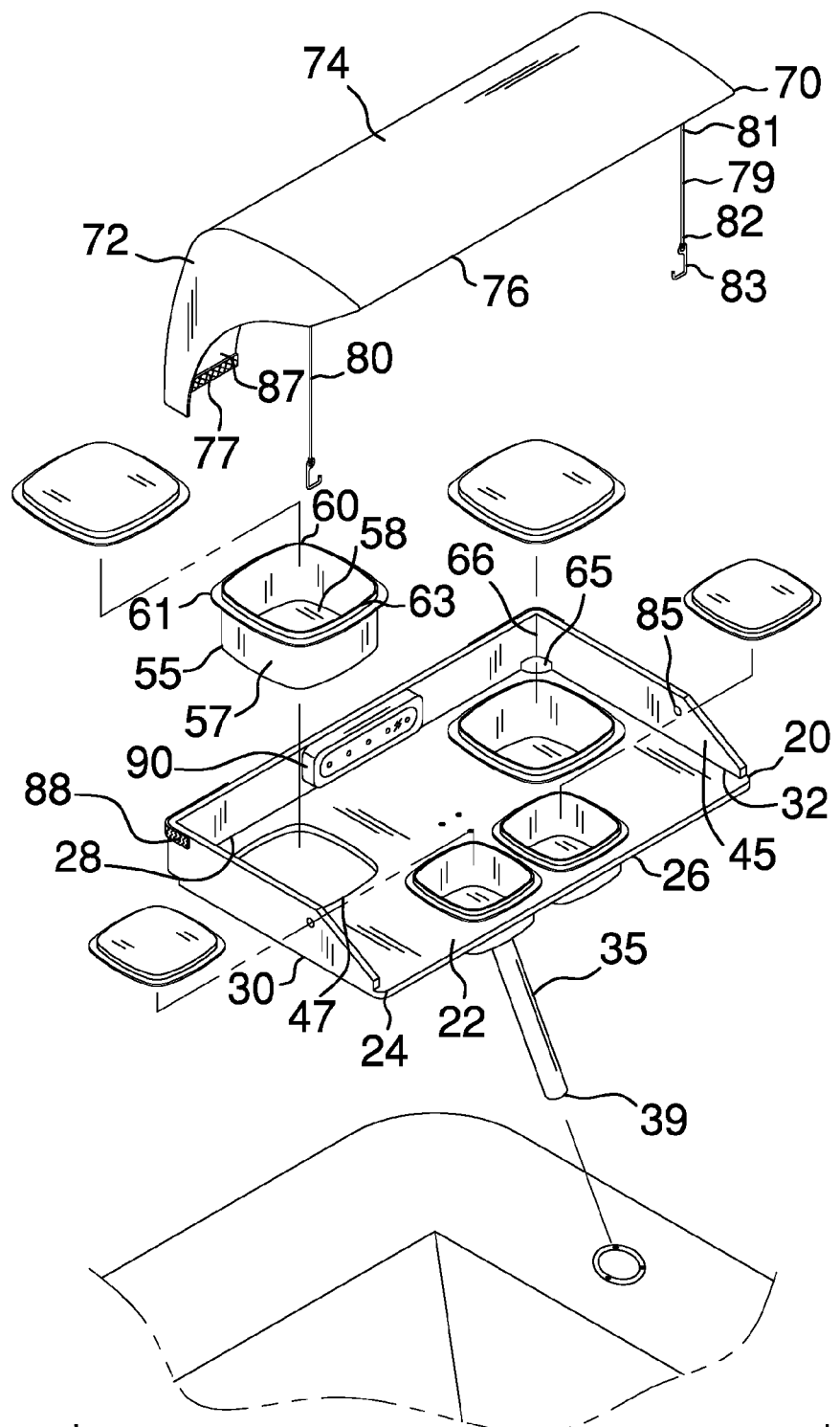
FIG. 2 is an exploded view showing the mounting of the tray body to a fishing pole holder of a boat.
Figure 3:
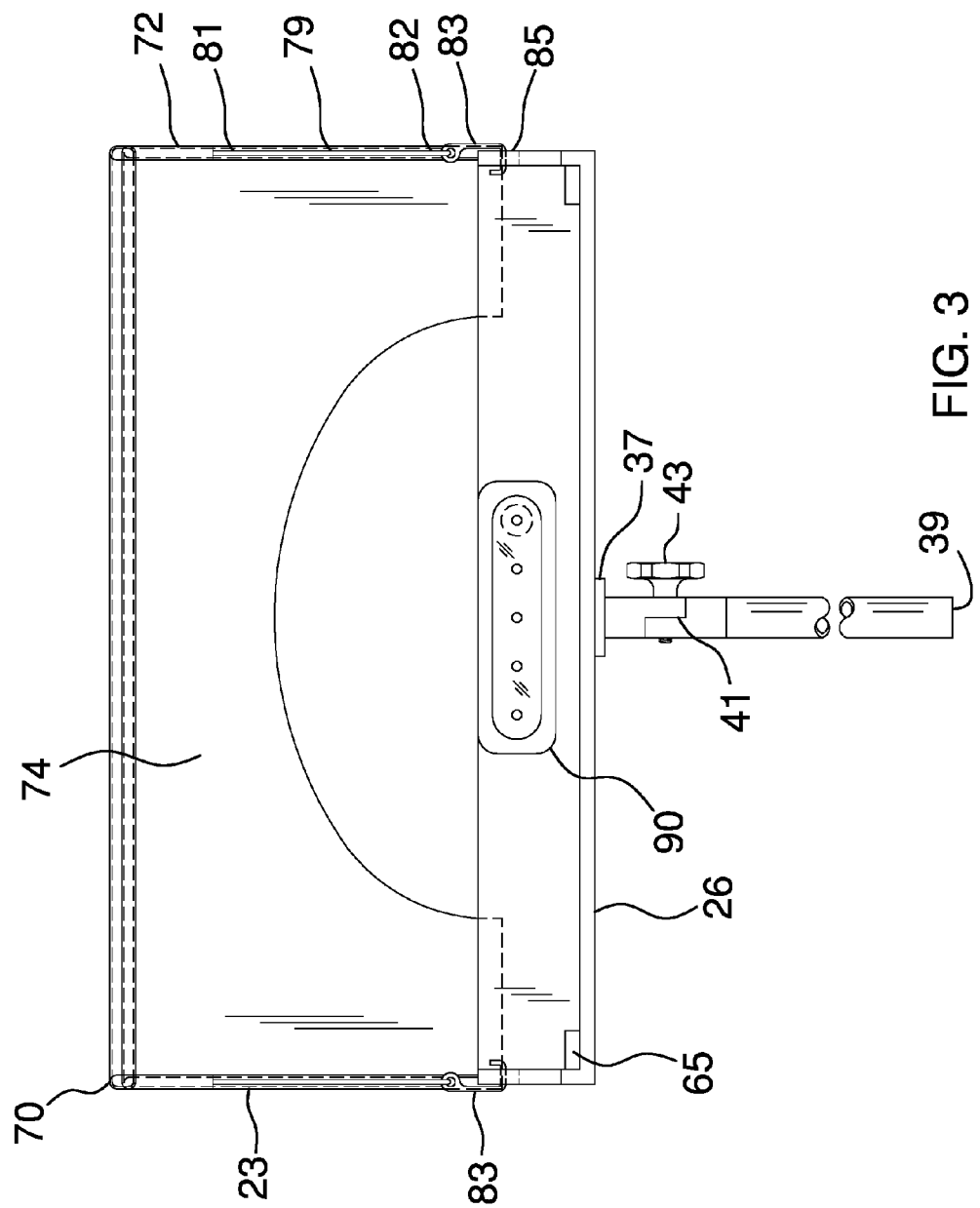
FIG. 3 is a front elevation view.
Figure 4:
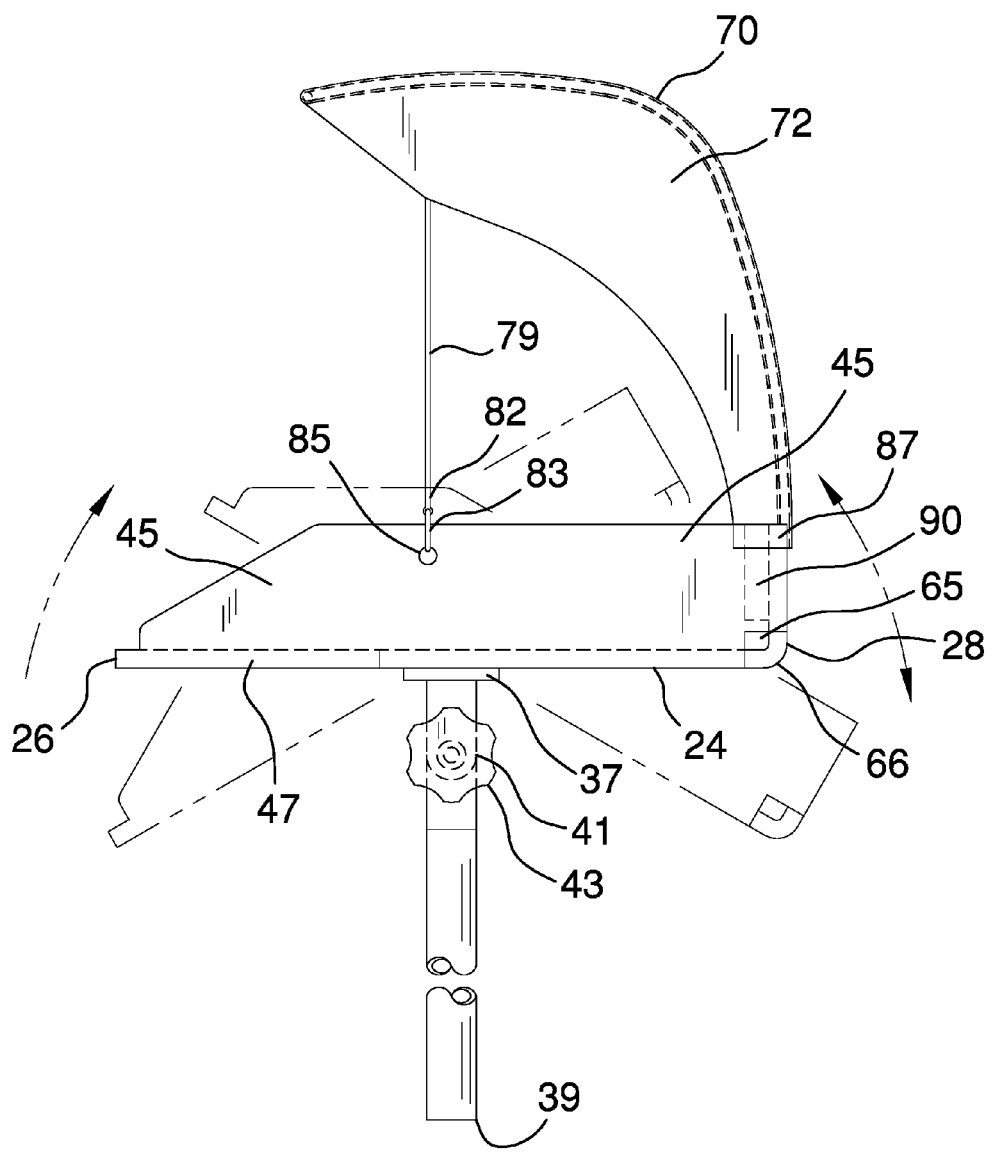
FIG. 4 is a side elevation view.

With reference now to the drawings, and in particular FIGS. 1 through 5 thereof, an example of the instant fishing pole holder mounted table for a boat employing the principles and concepts of the present fishing pole holder mounted table for a boat and generally designated by the reference number 10 will be described.

Referring to FIGS. 1 through 5, the present fishing pole holder mounted table for a boat 10 is illustrated. The fishing pole holder mounted table for a boat 10 includes a tray body 20. The tray body 20 has a top surface 22, a bottom surface 24, a front side 26, a rear side 28, a left side 30, and a right side 32. A cylindrical post 35 is provided to mount the tray body 20 within a fishing pole holder within a gunnel of the boat. The post 35 has a top end 37 centrally disposed on the bottom surface 24 of the tray body 20 and a bottom end 39 engageable to the boat fishing pole holder. The post 35 also includes a swivel joint 41 disposed proximal the top end 37. A lock knob 43 is in operational communication with the swivel joint 41 to lock the swivel joint 41 into a selected position to place the tray body 20 in a level condition. A raised perimeter wall 45 is continuously disposed along the right side 32, the rear side 28, and the left side 30.

A plurality of openings 47 is disposed in the tray body 20 from the top surface 22 through the bottom surface 24. A first pair 49 of the openings 47 is centrally disposed proximal the front side 26. A second pair 51 of the openings 47 is provided. Each of the openings 47 of the second pair 51 of openings 47 is disposed proximal the rear side 28 and a respective one of the left side 30 and the right side 32. Each of the openings 47 of the second pair 51 of openings 47 is larger than each of the openings 47 of the first pair 49 of openings 47.

A plurality of sealable containers 55 is provided for storing items, such as food. Each of the containers 55 is insertable within a respective one of the openings 47. Each container 55 has an impervious outer wall 57 and an impervious bottom wall 58, an open top side 60, and a lip 61 continuously extending outwardly along a perimeter 63 of the outer wall 57 directly adjacent the open top side 60. When each container 55 is inserted into the respective one of the openings 47, the lip 61 is disposed directly on the top surface 22 adjacent the outer wall 57 of the container 55. The perimeter wall 45 has a height greater than a height of the lip 61. A hole 65 is disposed at a corner 66 between the rear side 28 and each of the right side 32 and the left side 30. The raised perimeter wall 45 assists in protecting food items stored within the containers 55 from sloshing off the tray body 20, for instance in rough water conditions, and in preventing items disposed atop the tray body 20 from sliding off the tray body 20.

A shade 70 is provided to also protect items disposed within the containers 55 and atop the tray body 20 from negative environmental elements, such as heat and rain. The shade 70 has an inverted substantially U-shaped right wall 72, a left wall 73 which is a mirror image of the right wall 72, and a convex central portion 74 between the right wall 72 and the left wall 73. Each of the right wall 72, the left wall 73, and the central portion 74 has a forward end 76 and a rearward end 77. A pair of flexible removable rods 79 is provided to secure the shade 70 to the tray body 20. Each rod 79 has an upper end 81 attached to the forward end 76 of a respective one of the right wall 72 and the left wall 73, a lower end 82, and a hook 83 attached to the lower end 82. An aperture 85 is disposed approximately centrally within the perimeter wall 45 proximal each of the left side 30 and the right side 32. Each hook 83 is engageable to a respective one of the apertures 85.

A hook and loop fastener first strip 87 is disposed on the rearward end 77 of each of the right wall 72, the left wall 73, and a portion of the central portion 74 directly adjacent to each of the right wall 72 and the left wall 73. A hook and loop fastener second strip 88 is disposed on the perimeter wall 45 of the tray body 20 along a portion of the rear side 28 proximal each of the left and right sides 30, 32 and on each of the right side 32 and the left side 30 proximal the rear side 28. Each hook and loop fastener second strip 88 is engageable to the respective hook and loop fastener first strip 87 to further assist in attaching the shade 70 to the tray body 20.

A battery-operated light emitting diode light bar 90 is centrally disposed on the raised perimeter wall 45 between the hook and loop fastener second strips 88. The light bar 90 is one of water resistant and waterproof. The light bar 90 is provided to illuminate the tray bar 20 for assembly and also for viewing items on the tray bar 20 or with the containers 55 in low light or dark conditions.

What is claimed is:

1. A fishing pole holder mounted table for a boat comprising:
   a tray body having a top surface, a bottom surface, a front side, a rear side, a left side, and a right side;
   a cylindrical post having a top end centrally disposed on the bottom surface of the tray body and a bottom end engageable to a boat fishing pole holder within a gunnel of the boat;
   a raised perimeter wall continuously disposed along the right side, the rear side, and the left side;
   a plurality of openings disposed in the tray body from the top surface through the bottom surface; and
   a plurality of sealable containers, each of the containers insertable within one of the openings, each container having an impervious outer wall and an impervious bottom wall, an open top side, and a lip continuously extending outwardly along a perimeter of the outer wall directly adjacent the open top side;
   a hole disposed at a corner between the rear side and each of the right side and the left side;
   wherein when each container is inserted into the respective one of the openings, the lip is disposed directly on the top surface adjacent the outer wall of the container; and
   wherein the perimeter wall has a height greater than a height of the lip;
   a shade having an inverted substantially U-shaped right wall, a left wall, the left wall being a mirror image of the right wall, and a convex central portion between the right wall and the left wall, each of the right wall, the left wall, and the central portion having a forward end and a rearward end;
   a pair of flexible removable rods, each rod having an upper end attached to the forward end a respective one of the right wall and the left wall, a lower end, and a hook attached to the lower end;
   an aperture disposed approximately centrally within the perimeter wall proximal each of the left side and the right side, wherein each hook is engageable to a respective one of the apertures;
   a hook and loop fastener first strip disposed on the rearward end of each of the right wall, the left wall, and a portion of the central portion directly adjacent to each of the right wall and the left wall; and
   a hook and loop fastener second strip disposed on the raised perimeter wall of the tray body along a portion of the rear side proximal each of the right and left sides and on each of the right side and the left side proximal the rear side, wherein each hook and loop fastener second strip is engageable to the respective hook and loop fastener first strip.

2. The fishing pole holder mounted table for a boat of claim 1 comprising a light emitting diode light bar centrally disposed on the raised perimeter wall between the hook and loop fastener second strips, wherein the light bar is one of water resistant and waterproof.

3. A fishing pole holder mounted table for a boat comprising:
   a tray body having a top surface, a bottom surface, a front side, a rear side, a left side, and a right side;
   a cylindrical post having a top end centrally disposed on the bottom surface of the tray body, a bottom end engageable to a boat fishing pole holder within a gunnel of the boat, a swivel joint disposed proximal the top end, and a lock knob in operational communication with the swivel joint, wherein the lock knob is configured to lock the swivel joint into a selected position;
   a raised perimeter wall continuously disposed along the right side, the rear side, and the left side;

a plurality of openings disposed in the tray body from the top surface through the bottom surface;

a plurality of sealable containers, each of the containers insertable within a respective one of the openings, each container having an impervious outer wall and an impervious bottom wall, an open top side, and a lip continuously extending outwardly along a perimeter of the outer wall directly adjacent the open top side;

a hole disposed at a corner between the rear side, the raised lip, and each of the right side and the left side;

wherein when each container is inserted into the respective one of the openings, the lip is disposed directly on the top surface adjacent the outer wall of the container;

wherein the perimeter wall has a height greater than a height of the lip;

a shade having an inverted substantially U-shaped right wall, a left wall, the left wall being a mirror image of the right wall, and a convex central portion between the right wall and the left wall, each of the right wall, the left wall, and the central portion having a forward end and a rearward end;

a pair of flexible removable rods, each rod having an upper end attached to the forward end a respective one of the right wall and the left wall, a lower end, and a hook attached to the lower end;

an aperture disposed approximately centrally within the perimeter wall proximal each of the left side and the right side, wherein each hook is engageable to a respective one of the apertures;

a hook and loop fastener first strip disposed on the rearward end of each of the right wall, the left wall, and a portion of the central portion directly adjacent to each of the right wall and the left wall;

a hook and loop fastener second strip disposed on the raised perimeter wall of the tray body along a portion of the rear side proximal each of the right and left sides and on each of the right side and the left side proximal the rear side, wherein each hook and loop fastener second strip is engageable to the respective hook and loop fastener first strip; and a light emitting diode light bar centrally disposed on the raised perimeter wall between the hook and loop fastener second strips, wherein the light bar is one of water resistant and waterproof.

4. The fishing pole holder mounted table for a boat of claim 3 comprising:

a first pair of the openings centrally disposed proximal the front side; and a second pair of the openings, each of the openings of the second pair of openings being disposed proximal the rear side and a respective one of the left side and the right side;

wherein each of the openings of the second pair of openings is larger than each of the openings of the first pair of openings.

* * * * *